Nov. 21, 1933.  T. R. SCOTT ET AL  1,935,820
HIGH TENSION CABLE TERMINAL AND JOINT
Filed March 4, 1932  2 Sheets-Sheet 1

INVENTORS
THOMAS R. SCOTT
JOHN K. WEBB
BY
ATTORNEY

Nov. 21, 1933.     T. R. SCOTT ET AL     1,935,820
HIGH TENSION CABLE TERMINAL AND JOINT
Filed March 4, 1932     2 Sheets-Sheet 2
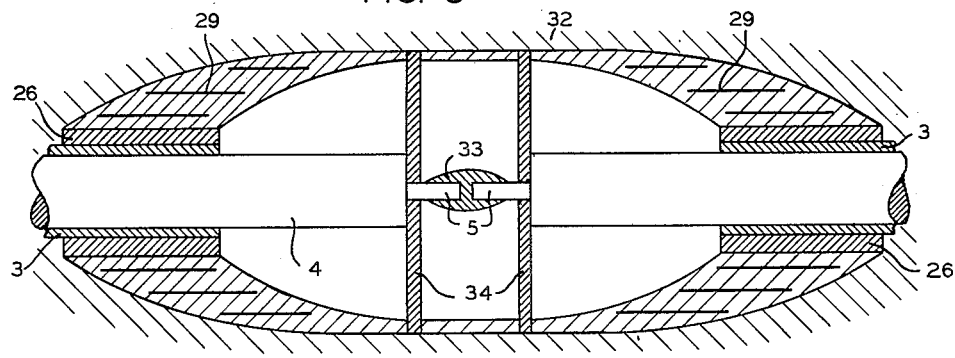
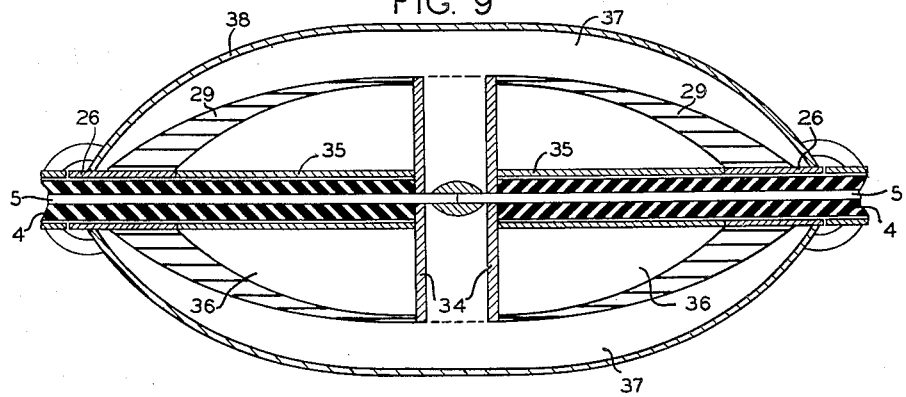
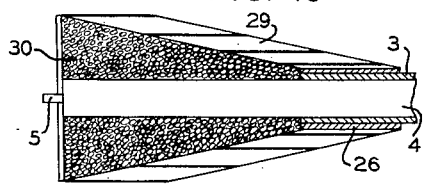
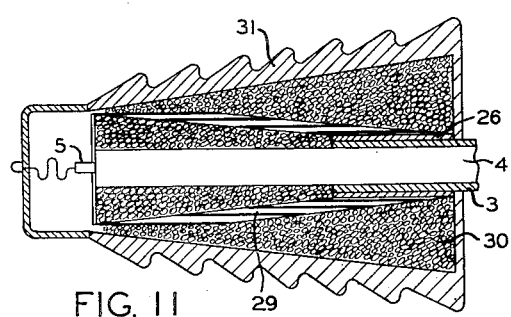
INVENTORS
THOMAS R. SCOTT
JOHN K. WEBB
BY
ATTORNEY Patented Nov. 21, 1933

1,935,820

UNITED STATES PATENT OFFICE 1,935,820

HIGH TENSION CABLE TERMINAL AND JOINT

Thomas R. Scott and John K. Webb, Aldwych, London, England, assignors to International Standard Electric Corporation, New York, N. Y., a corporation of Delaware Application March 4, 1932, Serial No. 596,724, and in Great Britain April 28, 1931

4 Claims. (Cl. 173—268)

This invention relates to terminals or joints for high tension electric cables and more particularly to the type in which a stress cone is used for rendering substantially uniform the pressure gradient over the insulation between the end of the cable core and the cover or sheath.

In such arrangements heretofore used the stress cone consisted of a bell mounted metallic member seated funnel fashion on the end of the lead sheath or cover of the cable. The exact angle or flare or divergence was determined by rather involved mathematical laws but the result was that in order to get satisfactory gradation of stress the mouth of the cone had to be inconveniently large.

One object of the present invention is to overcome this inconvenience.

According to one feature of the invention the stress cone is constituted by insulation separated metallized layers which grade the stress between core and sheath (or outer cover), the arrangement of the metallized layers being such that the flare or angle of the cone may be reduced considerably or that the mouth of the cone may be made less as compared with that of an ordinary stress cone designed to give substantially the same potential gradient.

According to another feature of the invention, the potential gradient in a cable termination or joint is rendered substantially uniform partly by the stress cone effect and partly by condenser grading.

According to another feature of the invention a joint or termination with condensers for uniformly grading the stress between the core and an outer covering or sheath of a high tension cable has the condensers constituted by metallized layers (foil, metallized paper or the like) separated by an insulating material (e. g. paper) so arranged that during use a metallized surface has a greater potential than another such surface which is situated nearer the core.

According to another feature of the invention, in order to make more uniform the electric stress in a cable joint or termination, there is applied about an end of the cable sheath a plurality of layers of insulation, metallized surfaces being inserted between the layers of insulation so as to form a cone whose base is remote from said sheath and constitute a plurality of condensers occupying different positions along the length of the cone. By connecting the outer electrode of the outer condenser to the core a gradation in stress may be obtained equal to that which could be obtained by an ordinary stress cone only provided the latter were of considerably greater diameter at its base than is the base of the improved stress cone.

According to another feature of the invention a cable joint or termination is provided in which the electric stress on the insulation is uniformly graded, or graded according to some preassigned values, by means which do not introduce other surfaces of ungraded stress connecting conductor and sheath.

In the accompanying drawings:—

Figs. 8 and 9 are sectional side elevations of cable joints according to the present invention.

Figs. 10 and 11 are sectional side elevations of a "test end" and "sealing bell" respectively using the stress cone of the present invention.

Figure 1:
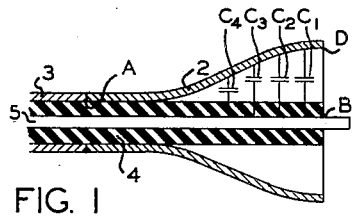
Fig. 1 illustrates a known type of stress cone.

The well known stress cone of Fig. 1 comprises a bell mouthed member 2 joined to the lead sheath 3 which surrounds an insulator 4 and a conductor 5. By this means the electric field is maintained normal to the axis of the cable.

Figure 2:
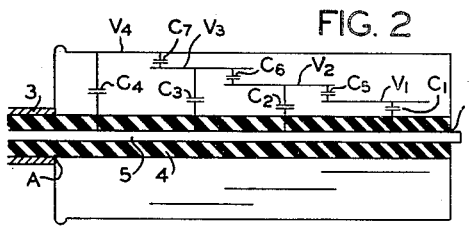
Fig. 2 illustrates a cable termination employing a known graded condenser arrangement for relieving the stress.

Fig. 2 shows a known arrangement in which a series of condenser layers $V_1 \ldots V_4$ are applied about the end of the dielectric 4 of a conductor 5. The condensers are in the form of metallized layers separated by an insulator, usually impregnated paper. The inner metallic layer approximates to core potential and the outer layer is approximately at earth (sheath) potential.

Figure 3:
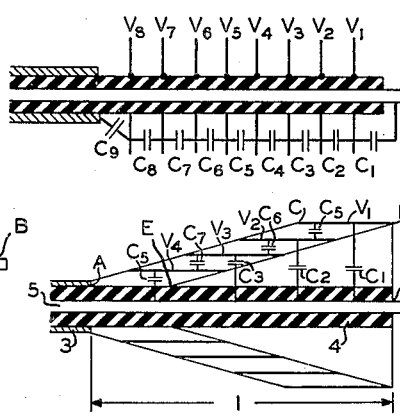
Fig. 3 illustrates the principle of a termination according to a method similar to that of Fig. 2.

A variation of the method is shown in Fig. 3 in which the grading capacities $C_1$, $C_2$, $C_3$ etc., are applied as auxiliary condensers, suitably insulated, from which conducting elements are brought to the insulator surface to be graded. The grading in this case depends on the values of the auxiliary capacities $C_1$, $C_2$ etc., and the position of the points on the surface of the insulation with which the conducting elements are in contact. An arrangement of this kind generally requires the use of condensers of inconveniently large size in order to obtain a sufficiently large capacity to stabilize the field.

In the method of Fig. 1 the potential across the dielectric from A to B is uniformly graded by the capacities $C_1$, $C_2$, $C_3$ whose value is controlled by the cone 2. Concentration of flux at a particular point of the dielectric is thereby avoided. It will be observed, however, that between the outer end of the cone and the core there is introduced an ungraded surface (of air or insulation if the cone be filled with insulation). Thus the elimination of one ungraded surface AB has given rise to another ungraded surface BD with all its attendant weakness to breakdown. The effect of the absence of grading can be made small by using a very large mouth for the cone but this is usually inconvenient.

Figure 4:
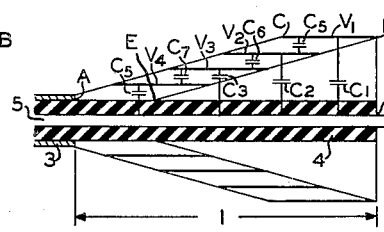
Fig. 4 illustrates diagrammatically one form of a stress cone according to the present invention.
Figure 5:
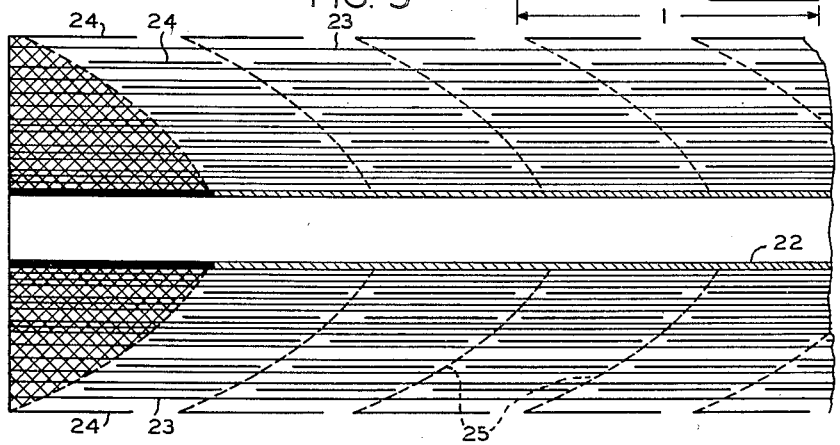
Fig. 5 is a sectional side elevation of stress cones such as Fig. 4, on their former.

The stress cone of Fig. 4 embodies the present invention. Condensers in the form of metallized layers $V_1 \ldots V_4$ are arranged as shown about the insulation 4 which surrounds the conductor 5. The outside condenser layer $V_1$ is connected to the core and the potential is graded so as to decrease from $V_1$ to $V_4$, which approximates to earth or sheath potential. By this arrangement it is found that the mouth of the cone may be considerably less than would be required on an ordinary stress cone of Fig. 1 to satisfy the same conditions. In the arrangement according to Fig. 4, the stress of the surface AB of the insulation is graded by the metallized layers $V_1 \ldots V_4$ which present to the core effective capacities $C_1$, $C_2$, $C_3$ and $C_4$ whereby the stress along the core insulation AB is graded uniformly. CA is now also graded by virtue of the capacities $C_5$, $C_6$, $C_7$ and also the surface DE is similarly graded. Since the core is connected to the outer metallized layer $V_1$ there is no stress between BD and this surface may conveniently be of metal (as in 34—Fig. 9). The application of core voltage to the outer electrode has also the advantage that the distance "1" may be usefully employed for an insulating cover (not shown) applied over the termination (e. g. porcelain insulator). In practice it is found that the stress cone of this invention can be made up economically to provide sufficiently large capacities to ensure stability and moreover it seems to provide a greater tolerance in respect of tilting during assembly than can be obtained from the ordinary stress cone.

Where the stress cones are built up of metal foil and insulating paper they may be constructed as shown in Fig. 5. The brass tube 22 is used as a former, the insulating sheet 23 being wound tightly on the former, the metal electrodes 24 (in the form of say tin foil) being inserted to form one complete convolution at appropriate diameters. During winding, the insulating sheet may be cut spirally as shown by the broken lines 25 thereby dividing the wound assembly into the requisite number of cones. A cone is taken from its former, mounted on a brass tube 26 (see Figs. 7–11) of about the same diameter as this former and this tube is slipped over the end of a cable sheath to give the arrangement of Fig. 4.

Figure 6:
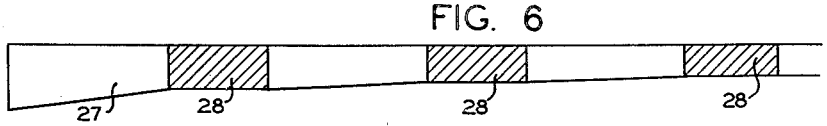
Fig. 6 illustrates a metallized paper as may be used in carrying out the present invention.
Figure 7:
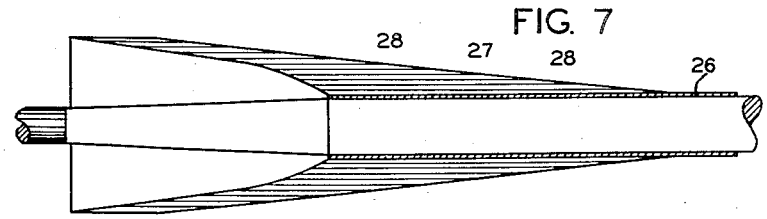
Fig. 7 is a sectional side elevation of a stress cone built up by using the metallized paper of Fig. 6.

In a modification the metal layers are formed by metallizing an insulating sheet 27 sectionally as shown at 28 in Fig. 6. The strip is thereafter wound on a brass tube former to constitute a cone as shown in Fig. 7 in which the metallized portions 28 alternate with the insulating sheet 27.

The metal tube "formers" 26 should be of such internal diameter as to provide an easy fit on the outer metallized paper of the dielectric or on the lead sheath of the cable. In certain cases where the tube and cone comprise a guard ring for testing purposes tolerance may be allowed to permit of light insulation of the sheath overall before the tube is slipped over.

The tube may conveniently be formed by wrapping a copper wire helically (with very short lay) round a mandrel of suitable size and tinning the cylinder so formed to give a flexible tube. This avoids acquisition of stocks of tubes to fit all sizes of sheath which may be encountered, enables good dimensional fitting to be obtained for special cases, and aids actual assembly by giving a measure of flexibility.

The insulating sheet or strip may be of paper, esterified paper, cellulose acetate or any other insulating material which is of low hygroscopicity, relatively high specific inductive capacity and resistant to "tracking" under surface electric stresses. Fibrous materials such as paper, esterified paper etc. will be impregnated before application in order to inhibit moisture absorption and to raise the specific inductive capacity— hydrocarbon oils or waxes may be used as the impregnating medium.

The general equation determining the number and position of condenser intersheaths introduced is $$C_n = \frac{n}{2}(N-1)C_0 + C_1$$

where $C_1$ is the capacity of the outer intersheath to the second and $C_0$ is the capacity of each sheet to the core. Thus $C_n$ is the capacity of the $n$th intersheath (counting from the outer surface) to the $(n+1)$th sheet.

If V is the potential difference between conductor and lead sheath the voltage drop between each sheet ($n$ sheets in all) is $$\frac{V}{n}$$

and by arranging a suitably large number of sheets the voltage gradient may be made approximately linear.

*Uses and adaptations of the improved stress cone*

The cone may be used for the following purposes.

(1) Grading stress on test ends in which case it may also constitute a guard ring.

(2) Grading stress on cable ends in sealing bells.

(3) Grading stress on cable ends in joints.

*1. Test ends*

In this case (Fig. 10) the cone is applied as a temporary measure during testing in order to effect economy of length of cable wasted in forming test end and to secure a stable test end for voltage tests, or for electrical measurements at high voltage.

The end is built up of a stress cone 29 on a form 26 which is similar to those of Fig. 4, 5, or 7 and fit over the cable sheath 3 as shown. The hollow of the cone in which the cable end 5 protrudes is in this case filled with oil, jelly or wax or with beads of solid insulating material or insulating material in powdered form as indicated at 30. In case beads are used it is preferable to fill the interstices between the beads with oil. The outer surface of the cone may be waxed to inhibit moisture absorption. Where the test end is also to serve as a guard ring this may be accomplished by lightly insulating the tube former 26 from the lead sheath 3.

2. Sealing bells

The sealing bell of Fig. 11 is very similar to the test end of Fig. 10 and like reference characters are used in both figures. A cover 31 of porcelain or the like is used and the space round the stress cone is filled with insulation 30.

3. Joints

In construction the joint of Fig. 8 is similar to two test ends (Fig. 10) placed together. Like reference characters indicate like parts in these two figures.

32 is ordinary insulating material and 33 the connection between the cable cores 5. The plates 34 are at the potential of the conductor.

In the baffle joint of Fig. 9 the stress cones 29 and formers 26 are as in Fig. 10. A tube 35 of, for instance, bakelite is situated over the cable insulation 4 and a mixture of oil and solid particles of insulating material (e. g. powdered cellulose, esterified powdered cellulose, powdered polymerized styrene or other material which can conveniently be mixed with oil to form a colloidal suspension of fair stability) is forced into the space 36 outside the tube 35. The oil escaping through pores of the cone 29 enters the outer insulation in space 37 which may thereby be thoroughly impregnated. The sealing members 34 may be of metal and serve to connect electrically the core conductor 5 to the outer layer of the cones 29. The whole joint is provided with insulation and a cover 38.

In an alternative the joint or termination may comprise an arrangement in which the ordinary stress cone is provided so as to extend for a part of the length of the bared insulation and the insulation between the mouth of the cone and the end of the insulation be graded by condenser grading.

What is claimed is:

1. A method of terminating a high tension electric cable at a joint or terminal end thereof which comprises placing about an end of the cable sheath a plurality of layers of insulation with conducting surfaces inserted between them in such manner as to form a cone whose base is remote from said sheath and to constitute a plurality of condensers occupying different positions along the length of the cone, the outer condenser being electrically connected to the core of the cable.

2. In combination a high tension electric cable, a stress cone on the end of said cable comprising alternate conducting and insulating surfaces constituting a plurality of condensers, means for connecting the outer conducting surface to the core of the cable, and means for connecting the inner conducting surface to the sheath of said cable.

3. In combination a high tension electric cable, a stress cone on the end of said cable comprising alternate conducting and insulating surfaces constituting a plurality of condensers, means for connecting the outer conducting surface to the core of the cable, and means for connecting the inner conducting surface to the sheath of said cable combined with a casing and insulating material inside and outside said stress cone in said casing.

4. A joint for a high tension electric cable comprising two stress cones as claimed in claim 2 placed base to base respectively on the terminating ends of the cables to be joined.

THOMAS R. SCOTT.
JOHN K. WEBB.